March 20, 1951 R. B. KERR 2,546,126

PHASE CONVERTING CIRCUIT

Filed Oct. 13, 1949

ROBERT B. KERR
INVENTOR.

BY D. Carl Richards
AGENT

Patented Mar. 20, 1951

2,546,126

UNITED STATES PATENT OFFICE 2,546,126

PHASE CONVERTING CIRCUIT

Robert B. Kerr, Dallas, Tex., assignor, by mesne assignments, to Socony-Vacuum Oil Company, Incorporated, New York, N. Y., a corporation of New York Application October 13, 1949, Serial No. 121,186

8 Claims. (Cl. 321—57)

This invention relates to the generation of high frequency voltages and more particularly to the development of a three-phase voltage from a single-phase source at radio frequencies.

In frequency modulated carriers for radio transmission, phase modulation systems and reactance-tube frequency-modulated oscillator systems are well known. A third and newer modulation scheme has resulted in development of a modulation tube available commercially under the trade name "Phasitron." This tube requires for its operation a three-phase voltage at the assigned radio frequency for controlling a beam of electrons flowing from cathode to anode. The three-phase voltage might be supplied from three separate oscillators suitably synchronized. Such an expedient, however, would require an excessive number of circuit components. In attempting to provide a more simple circuit, it has been found difficult to develop a three-phase voltage from a single-phase source at such high frequencies while at the same time maintaining a high impedance level without incurring excessive power losses in the phase converting circuit. It is desirable to provide the required three-phase voltage at frequencies in the order of from 1600 to 1700 kilocycles and higher to operate, for example, in those bands of radio frequencies allocated for geophysical exploration and other industrial communication systems.

In seismic exploration, systems such as disclosed in the Patent No. 2,413,116 to Shook et al. have been used to transmit to a recording station via F. M. timing impulses related to the instant of detonation of an explosive charge. By utilizing the above-mentioned "Phasitron" tube in connection with the three-phase voltage deriving network of the present invention, the requirements for this particular application have been fully met. It will be evident that, even though this secific application has been adopted for the purpose of the present description, the invention is not limited to communication in the field of geophysics or to use with such a modulation tube since the phase converting circuit of the present invention may be utilized with any circuit requiring a three-phase voltage for its operation. Nor is the invention limited to the transmission of timing pulses since any intelligence may be transmitted, subject only to general limitations not related to the operation of the source of carrier voltage.

In accordance with the present invention and in one embodiment thereof, there is provided a circuit for converting a single-phase radio frequency input voltage to a three-phase output voltage which comprises a tuned transformer and a circuit for connecting the input voltage to a portion of the primary winding of the transformer. Three circuit output terminals are provided, two of which are connected to the secondary winding of the transformer and the other being connected to the primary winding. A neutral terminal is connected midway of the primary winding. The two output voltages appearing between the output terminals and said neutral terminal are characterized by being in quadrature phase displacement with respect to the third output voltage derived from the primary winding. Resistance means connected across the input terminals of the transformer and to the midpoint of the secondary winding of the transformer injects a voltage therein which changes the quadrature phase relationship to a symmetrical three-phase output voltage.

For a more complete understanding of the present invention and for further objects and advantages thereof, reference may now be had to the following description taken in conjunction with the accompanying drawings in which.

Figure 1:
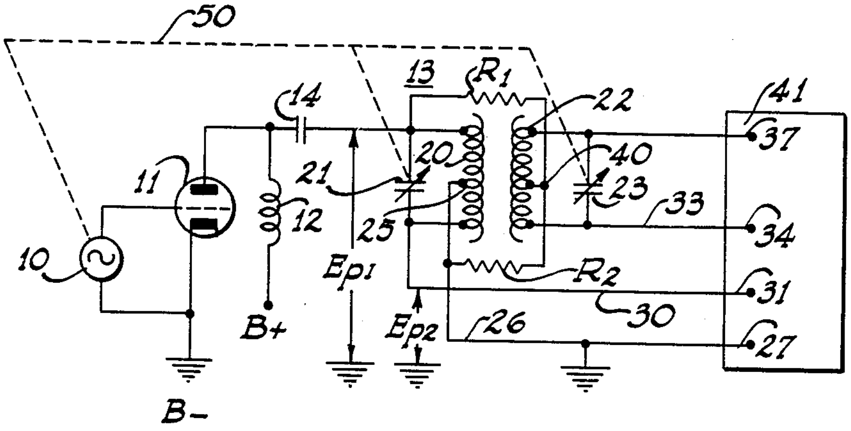
Fig. 1 is a schematic diagram of the phase converting circuit.

Referring now to Fig. 1, a source of radio frequency voltage 10 is connected in the grid circuit of a buffer amplifier tube 11. The anode of the amplifier tube 11 is connected to a source of anode supply (B+) by way of a choke coil 12. The signal from the source 10 is coupled to the phase converting circuit 13 by way of condenser 14 and provides a single-phase voltage $E_{p1}$ at the input of the phase converting circuit 13 from which a symmetrical three-phase voltage is developed.

The phase converting circuit includes an air core transformer having a primary winding 20 which is tuned to resonance at the frequency of the source 10 by the condenser 21 connected in parallel therewith. Similarly, the secondary winding 22 is tuned to resonance of the source 10 by the condenser 23. An intermediate tap 25 on the primary winding 20 is connected by way of conductor 26 to ground and forms the second input terminal and also the neutral or reference terminal for the three-phase output system.

The first of the output voltages is derived from or appears across the lower portion of the primary winding 20. More particularly, the circuit for "phase one" includes conductor 30 connected to the lower extremity of primary 20 and to an output terminal 31. "Phase two" of the output voltage appears between one extremity of the secondary winding 22 and the neutral point 25 of the primary winding, conductor 33 connecting the lower extremity of the secondary winding 22 to the output terminal 34. Similarly, the third phase appears between the center tap 25 and the upper extremity of the secondary winding 22 which is connected by way of conductor 36 to the output terminal 37.

The voltage $E_{27-31}$ leads the voltage $E_{27-34}$ by 90° and lags the voltage $E_{27-37}$ by 90° as explained below. To convert this quadrature phase relation into a symmetrical three-phase voltage, a voltage dividing network is connected across the input to the network 13 and is comprised of resistors $R_1$ and $R_2$ connected in series. The point 40 intermediate the resistors $R_1$ and $R_2$ of the voltage dividing network is connected to the center tap of the secondary winding 22 and injects a voltage into the secondary which adds vectorially with both $E_{27-34}$ and $E_{27-37}$ to alter them both in amplitude and phase. By suitably choosing the constants of primary winding 20, secondary winding 22, the coupling between the windings and the ratio of $R_1$ to $R_2$, the three voltages appearing between the neutral terminal 27 and each of terminals 31, 34, and 37 will be symmetrically spaced 120° apart and of equal magnitude for application to the aforementioned "Phasitron" tube or to any other utilization circuit generically illustrated by the block 41 requiring such three-phase voltage.

Figure 2:
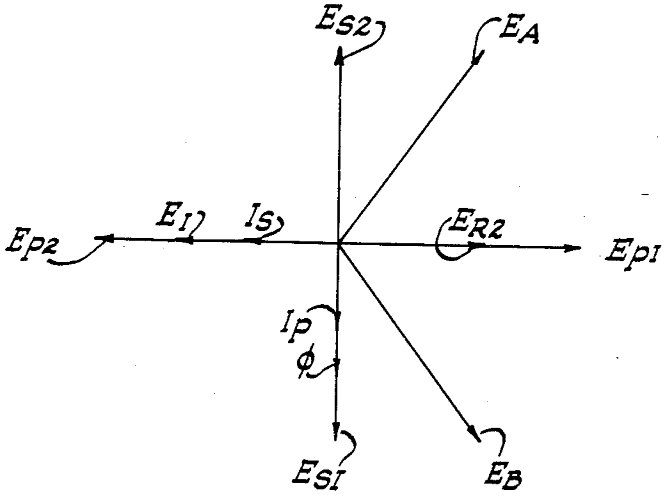
Fig. 2 is a vector diagram of the voltage, current and flux relationships of the circuit of Fig. 1.

The operation of the circuit of Fig. 1 may best be understood by referring to the vector diagram of Fig. 2. The vector $E_{p1}$ represents the input signal applied to the upper half of the primary winding 20. A second voltage $E_{p2}$ equal in magnitude to $E_{p1}$ and 180° out of phase appears across lower half of the primary winding 20. Since the primary winding is purely inductive, the input current $I_p$ flowing therethrough lags the voltage $E_{p1}$ by 90°. The flux ($\phi$) resulting from flow of current $I_p$ links the secondary winding 22 and is exactly in-phase with the current $I_p$. That portion of the flux ($\phi$) which links the secondary winding 22 induces a voltage $E_1$ which drives a current $I_s$ through the secondary circuit. The induced E. M. F., $E_1$ lags the flux ($\phi$) by 90° and therefore lags the primary voltage $E_{p1}$ by 180°. Since the transformer secondary circuit is resonated exactly at the frequency of the source 10, the impedance presented thereby to the induced voltage $E_1$ is a pure resistance. As a result the current $I_s$ is in phase with $E_1$. Since the secondary winding 22 is for all practical purposes purely inductive, the voltage drop produced by flow of current $I_s$ lags current $I_s$ by 90°. However, if the reference point is taken as the midtap of the primary winding, the voltage $E_{s1}$ leads current $I_s$ while voltage $E_{s2}$ lags current $I_s$. In the absence of the voltage dividing network $R_1$–$R_2$ the voltage ($E_{p2}$) appearing between the neutral point 27 and output terminal 31 would be lagging by 90° the voltage ($E_{s1}$) appearing between the neutral terminal 27 and point 34 and would be leading by 90° the voltage ($E_{s2}$) appearing between neutral 27 and output terminal 37.

By suitably adjusting the coupling and turns ratio of the transformer (altering the relative magnitudes of $E_{s1}$ and $E_{s2}$ to $E_{p2}$) and the resistances $R_1$ and $R_2$ (altering the relative magnitude of $E_{R2}$ injected into the secondary circuit), the phase of the resultant voltages $E_{27-34}$ and $E_{27-37}$ may be shifted from the quadrature relationship to one of a 120° symmetrical spacing and of equal magnitude. This relationship will be obtained when the magnitude of the respective voltages is such that the sum of $(E_{R2})^2$ and $(E_{s1})^2$ or $(E_{s2})^2$ is equal in magnitude to $(E_{p2})^2$. For example, if the voltage $E_{p2}$ has a relative magnitude of five, the coupling and turns ratio of the transformer may be adjusted until the relative magnitude of both of the voltages $E_{s1}$ and $E_{s2}$ is four. Under such condtions, a voltage component $E_{R2}$ having a relative magnitude of three and in phase with the applied voltage $E_{p1}$ when injected into the secondary circuit adds vectorally with the voltages $E_{s1}$ and $E_{s2}$ to shift the phase of both of the last-named voltages from the quadrature relationship with respect to the voltage $E_{p2}$ so that the output voltages are symmetrically spaced at angles of 120°. Additionally, the relative magnitudes are changed from four to five. Thus there is produced at the output or utilization circuit 41 a symmetrical three-phase to neutral voltage which may be used for any required purpose.

An important feature in the operation of the phase converting circuit resides in the fact that both primary and secondary windings of the transformer are tuned to resonance at the frequency of the source. This means that the source works into a high impedance network thus requiring but a minimum dissipation of power. The above-mentioned "Phasitron" tube requires approximately 35 volts to neutral on each of the three phases. If resistance-capacitance phase converting circuits are used, the total impedance for nominal sized components is so low that the dissipation may be as high as 10 or 15 watts. Further, at such frequencies the stray capacities in the circuit may become so large with respect to lumped impedances that positive control over the adjustment of the circuit by variation of the lumped impedance is lacking. In the tuned-primary tuned-secondary transformer system of the present invention, the condensers 21 and 23 paralleled with the stray capacities of the circuit are of such size that they provide the major control for adjustment of the frequency selective characteristics of the circuit.

The advantages of the above features may be further appreciated by illustration of operation of the circuit where it may be necessary under certain conditions to switch from one frequency to another within an assigned band for clear channel operation. Switching means 50 connected both to the source 10 and to the variable plates of condensers 21 and 23 may be utilized in applicant's circuit to change from one operating frequency to another while a similar frequency change in other circuits is not so readily accomplished because of their inherently low impedance.

In the modification of the invention illustrated in Fig. 1, the following specifications were found to be satisfactory. The primary winding 20 and secondary winding 22 each comprised approximately 280 turns of #28 wire wound on cylindrical ⅝" diameter insulators, the length of each winding being 1.75". The coupling between the primary and secondary winding was set by placing the two coils with their axes parallel and their peripheries tangent. Condensors 21 and 23 were variable, in the range of from 65 to 100 $\mu\mu f$, the exact value depending upon the frequency of operation. Resistor $R_1$ had a value of 400,000 ohms, and resistor $R_2$ was 560,000 ohms. With the circuit constructed as illustrated in Fig. 1 and having the features and parameters above described, 35 volts applied to the input (upper half of primary 20) produced three output voltages of approximately 35 volts and symmetrically displaced in phase between neutral 27 and each of the output terminals 31, 34 and 37.

While the invention has been illustrated and described with such particularity as to enable one skilled in the art to make and use the same, it is to be understood that modifications will now suggest themselves to those skilled in the art, and it is intended to embrace such modifications as fall within the scope of the appended claims.

What is claimed is:

1. A system for converting a single-phase voltage to a three-phase voltage comprising a transformer including tuned primary and secondary windings into the primary of which the input voltage is fed, circuit means for deriving from the secondary winding two equal output voltages 180 degrees apart and in quadrature phase relation with the input voltage, circuit means for deriving a third output voltage 180 degrees out of phase with the input voltage from the primary winding, means for introducing a predetermined portion of the input voltage into the output circuits connected to said secondary windings whereby the resultant voltages in the three output circuits may be made of equal magnitude and 120 degrees out of phase.

2. A circuit for converting a single-phase input voltage into a three-phase output voltage which comprises a transformer including tuned primary and secondary windings, an input circuit including at least a portion of the primary winding of said transformer, means for injecting a portion of said input voltage at a tap intermediate the ends of said secondary winding, a neutral output terminal connected to said primary winding and to said last named means, three output circuits each including said neutral terminal with the first including a portion of said transformer primary winding and the remaining two output circuits including portions of said secondary winding on opposite sides of said tap.

3. A circuit for converting a single-phase input voltage to a three-phase output voltage which comprises a transformer including tuned primary and secondary windings, a circuit for applying said input voltage at a first terminal to a portion of the primary winding of said transformer, three output terminals, two of which are connected to the secondary winding of said transformer, the other being connected to a second terminal on the primary winding thereof, an output neutral terminal connected intermediate said first and second terminals of the primary winding of said transformer for producing at said output terminals three voltages with respect to said neutral terminal two of which are characterized by being in quadrature phase displacement with respect to the third output voltage, and resistance means connected between said input terminals and the midpoint of the secondary winding of said transformer for injecting a voltage therein whereby said quadrature phase relationship is changed to a symmetrical three-phase relationship with respect to said neutral terminal.

4. A system for converting a single-phase input voltage to a three-phase output voltage which comprises a transformer having both primary and secondary windings tuned to the frequency of said single-phase voltage, an input circuit connected to the center of said primary winding and to one extremity thereof, a first output circuit connected between said center and the other extremity of said primary winding, output terminals connected to the extremities of said secondary winding, the voltages appearing between said last-named terminals and said center tap of said primary winding each having a quadrature phase relationship with respect to the voltage in said first output circuit, and resistance means for injecting a portion of said input voltage into said secondary winding for changing said quadrature phase relationship of said output voltages to a symmetrical three-phase relationship.

5. A phase converting circuit comprising a transformer having tuned primary and secondary windings with center taps on said windings, a single-phase voltage source connected between an input terminal of the transformer primary winding and an intermediate terminal thereof, three output terminals formed respectively by the second terminal of the primary winding and the two extremities of the secondary winding, a resistance connected between said intermediate terminal of said transformer primary and the center terminal of said transformer secondary winding, and a second resistance connected between said center terminal of said secondary winding and said input terminal of said transformer primary winding for producing at said output terminals a symmetrical three-phase voltage with respect to the center tap on said transformer primary winding.

6. A system for converting a single-phase input voltage to a three-phase output voltage which comprises a transformer having both primary and secondary windings tuned to the frequency of said single phase voltage, an input circuit connected to the center of said primary winding and to one extremity thereof, a first output circuit connected between said center and the second extremity of said primary winding, a second and a third output terminal respectively connected to opposite extremities of said secondary winding, the voltage appearing between said last-named terminals and said center of said primary winding each having a quadrature phase relationship with respect to the voltage in said first output circuit and a voltage dividing network connected across said input circuit and to the center tap of said secondary winding for injecting a voltage into said secondary winding in phase with the voltage from said source for changing said quadrature phase relationship of said output voltages to a symmetrical three-phase relationship.

7. A circuit for converting the voltage from a single-phase source to a three-phase output voltage which comprises a transformer, means for resonating both the primary winding and secondary winding of said transformer at the frequency of the voltage of said source, means for connecting said source to one end of said transformer primary and to a center terminal thereof, a neutral output terminal, means for connecting said center terminal to said neutral output terminal, three output terminals, means for connecting said last-named terminals respectively to the second end of said transformer primary winding and to opposite ends of said transformer secondary winding, the coupling and turns ratio of said transformer being adjusted for the production of voltages between each end of said secondary windings and said neutral in the ratio of four to five with respect to the voltage between said second end of said primary and said neutral, the latter voltage having a quadrature phase relationship with respect to the former, a resistance network connected across said input terminals, and means for connecting an intermediate point on said network to the center tap of said secondary winding to inject a voltage into said secondary winding having a relative magnitude of three with respect to the voltage appearing between said second end of said transformer primary winding and said neutral terminal and in phase with said input voltage to change said quadrature phase relationship to a symmetrical three-phase relationship and to increase the relative magnitude of said secondary voltages from four to five.

8. In a frequency modulation transmitter having a single-phase source of variable radio frequency voltage and a three-phase radio frequency utilization circuit, the combination comprising a transformer, means for tuning both the primary winding and the secondary winding thereof to the frequency of said single-phase source, means for connecting said single-phase source between one extremity and an intermediate terminal of said transformer primary winding, said intermediate terminal serving as a neutral for a three-phase output voltage, means for connecting the second extremity of said transformer primary winding to said utilization circuit, means for connecting both of the extremities of said transformer secondary winding to said utilization circuit, the voltages appearing between said three last-named extremities having a quadrature phase relationship, resistance means for injecting a portion of said input voltage into said secondary winding for changing said quadrature phase relationship to a symmetrical three-phase relationship, and means mechanically coupling said source and said tuning means for both said primary and secondary windings simultaneously to change the frequency of said source and the resonant frequency of said transformer independently of said symmetrical three-phase relationship.

ROBERT B. KERR.

REFERENCES CITED

The following references are of record in the file of this patent:

UNITED STATES PATENTS

| Number | Name | Date |
|---|---|---|
| 1,973,010 | Morrison | Sept. 11, 1934 |
| 2,480,576 | Helber | Aug. 30, 1949 |
| 2,511,131 | Singh | June 13, 1950 |